(12) United States Patent
Moutton

(10) Patent No.: US 9,504,205 B2
(45) Date of Patent: Nov. 29, 2016

(54) VARIABLE STROKE CLEANING SYSTEM DRIVE IN AN AGRICULTURAL HARVESTER

(71) Applicant: CNH Industrial America LLC, New Holland, PA (US)

(72) Inventor: Bart Moutton, Gits (BE)

(73) Assignee: CNH Industrial America LLC, New Holland, PA (US)

( * ) Notice: Subject to any disclaimer, the term of this patent is extended or adjusted under 35 U.S.C. 154(b) by 36 days.

(21) Appl. No.: 14/693,457

(22) Filed: Apr. 22, 2015

(65) Prior Publication Data

US 2015/0296713 A1 Oct. 22, 2015

(30) Foreign Application Priority Data

Apr. 22, 2014 (BE) .................................. 2014/0282

(51) Int. Cl.
*A01F 12/32* (2006.01)
*A01F 12/44* (2006.01)
*A01D 41/127* (2006.01)

(52) U.S. Cl.
CPC ......... *A01F 12/448* (2013.01); *A01D 41/1276* (2013.01)

(58) Field of Classification Search
CPC .... A01F 12/446; A01F 12/448; A01F 12/56; A01D 41/1274; A01D 41/1276
USPC ....... 460/85, 90–92, 101, 102, 116, 145–147
See application file for complete search history.

(56) References Cited

U.S. PATENT DOCUMENTS

| 7,322,882 | B2 | 1/2008 | Duquesne et al. |
| 7,553,226 | B2 * | 6/2009 | Dhont ................... A01D 75/282 460/101 |
| 8,939,829 | B2 * | 1/2015 | Murray ................. A01F 12/448 460/101 |
| 2006/0229119 | A1 | 10/2006 | Wamhof et al. |
| 2015/0319931 | A1 * | 11/2015 | Missotten .............. A01D 41/12 460/101 |

FOREIGN PATENT DOCUMENTS

| AT | 386767 B | 10/1988 |
| DE | 803497 C | 4/1951 |
| DE | 2753505 A1 | 6/1979 |
| DE | 19649020 A1 | 5/1998 |
| DE | 102005050751 A1 | 8/2007 |
| DE | 102009000797 A1 | 8/2010 |
| DE | 102009026870 A1 | 12/2010 |
| EP | 1817951 A1 | 8/2007 |

* cited by examiner

*Primary Examiner* — John G Weiss
(74) *Attorney, Agent, or Firm* — Patrick M. Sheldrake

(57) ABSTRACT

A cleaning section of an agricultural harvester including a sieve and at least one variable stroke sieve drive wherein the sieve is positioned in the harvester to receive crop material from a threshing section and the at least one variable stroke sieve drive is coupled to the sieve wherein the variable stroke sieve drive has a first shaft and a second shaft concentric with the first shaft and the relative angular position between the first shaft and the second shaft establishes an amount of eccentricity of the variable stroke sieve drive.

12 Claims, 4 Drawing Sheets

VARIABLE STROKE CLEANING SYSTEM DRIVE IN AN AGRICULTURAL HARVESTER

This application claims foreign priority under 35 U.S.C. §119 to Belgian Application BE2014/0282 filed Apr. 22, 2014 titled "Variable Stroke Cleaning System Drive in an Agricultural Harvester" and having Bart Moutton as the inventor. The full disclosure of BE2014/0282 is hereby incorporated herein by reference.

BACKGROUND OF THE INVENTION

The present invention relates to agricultural harvesters such as combines, and, more particularly, to a sieve drive that is easily adjusted to vary the stroke of the drive in cleaning systems used in such combines.

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material, such as straw, from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

A problem in the prior art is that adjustments of the sieve vibration are not easily executed during operation and for the most part are static during the harvesting operation.

What is needed in the art is a dynamic sieve control system that can easily adjust the stroke of the eccentric sieve drive.

SUMMARY OF THE INVENTION

The present invention provides a system and method of varying the stroke of an eccentric drive coupled to a sieve in an agricultural harvester.

The invention in one form is directed to a cleaning section of an agricultural harvester, the cleaning section including a sieve and at least one variable stroke sieve drive. The sieve is positioned in the harvester to receive crop material from a threshing section. The variable stroke sieve drive is coupled to the sieve. The variable stroke sieve drive has a first shaft and a second shaft concentric with the first shaft. The relative angular position between the first shaft and the second shaft establish the amount of eccentricity of the variable stroke sieve drive.

The invention in another form is directed to a method of altering a length of a stroke experienced by a sieve in the cleaning section of an agricultural harvester. The method includes the steps of determining a need to alter the stroke, and shifting the angular position of a first shaft relative to a second shaft in a variable stroke sieve drive.

The present invention advantageously allows the eccentric stroke of the drive to be easily varied.

Another advantage of the present invention is that it reduces grain loss.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material, which is threshed and separated, from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
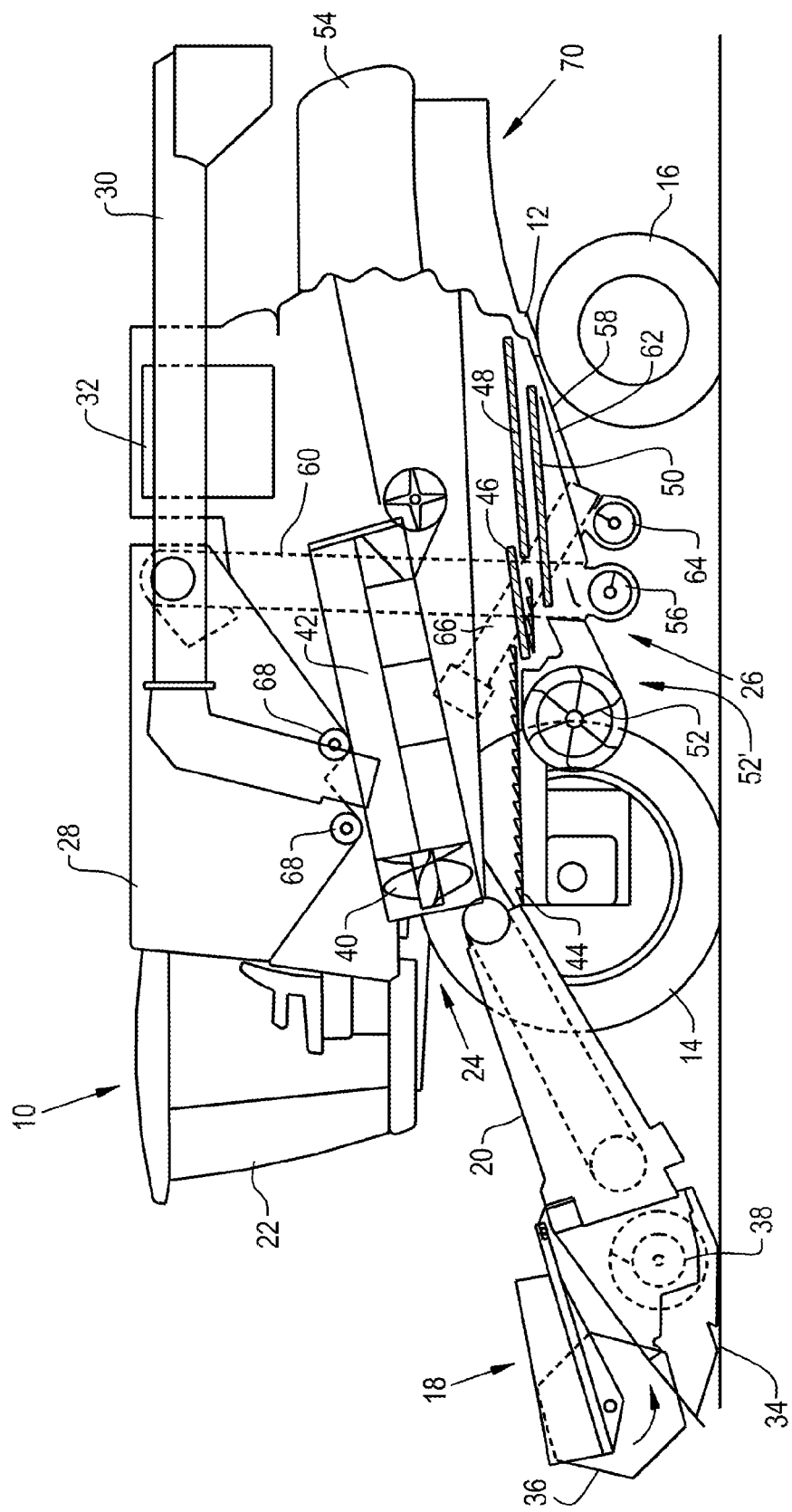
FIG. 1 is a side view of an embodiment of an agricultural harvester in the form of a combine which includes an embodiment of a variable stroke sieve drive of the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30.

The front wheels 14 are larger flotation type wheels, and the rear wheels 16 are smaller steerable wheels. Motive force is selectively applied to the front wheels 14 through a power plant in the form of a diesel engine 32 and a transmission (not shown). Although the combine 10 is shown as including wheels, is also to be understood that the combine 10 may include tracks, such as full tracks or half-tracks.

The header 18 is mounted to the front of the combine 10 and includes a cutter bar 34 for severing crops from a field during forward motion of the combine 10. A rotatable reel 36 feeds the crop into the header 18, and a double auger 38 feeds the severed crop laterally inwardly from each side toward the feeder housing 20. The feeder housing 20 conveys the cut crop to the threshing and separating system 24, and is selectively vertically movable using appropriate actuators, such as hydraulic cylinders (not shown).

Figure 2:
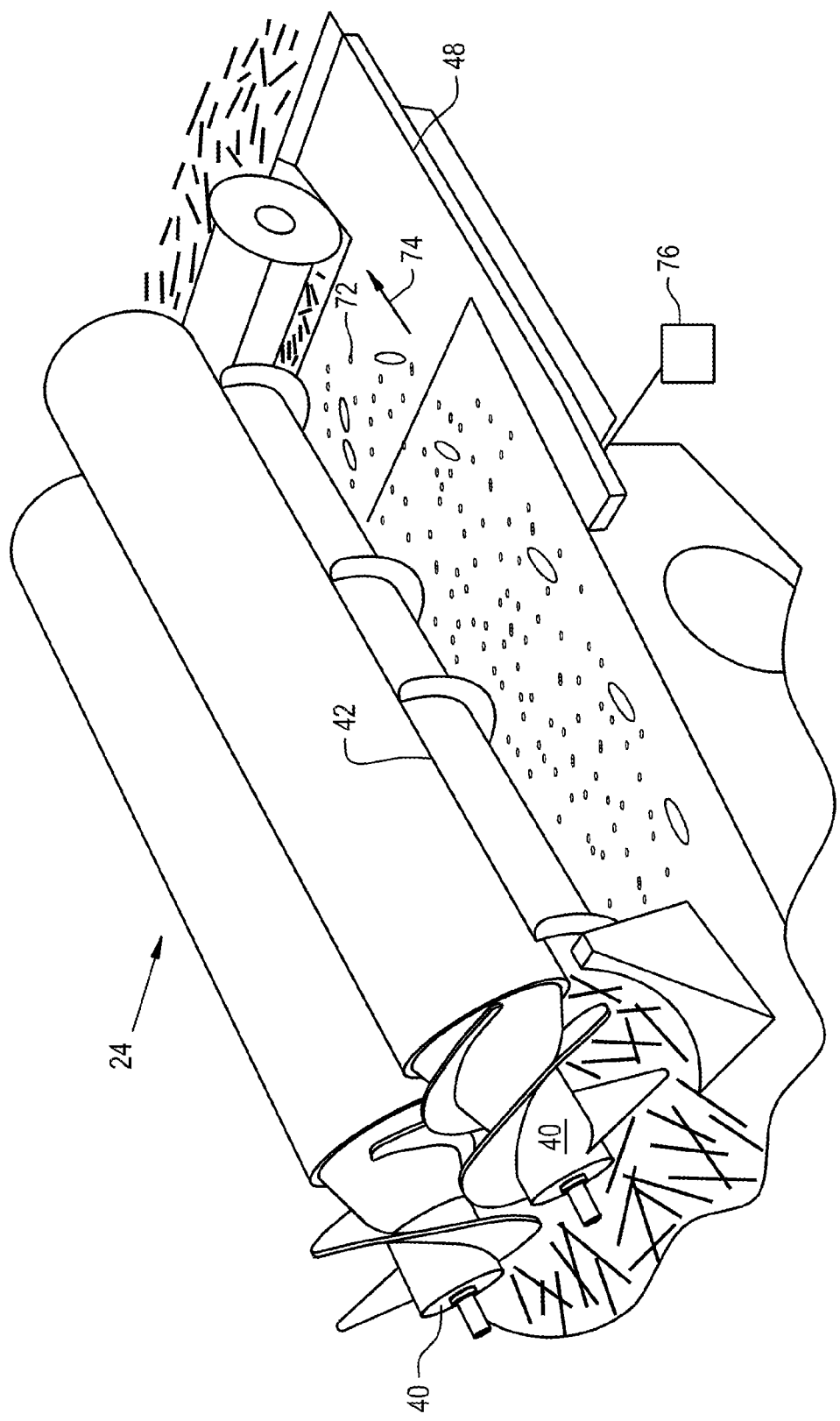
FIG. 2 is a perspective view of part of the threshing and the cleaning systems contained in the combine of FIG. 1.

The threshing and separating system 24 shown in FIGS. 1 and 2 is of the axial-flow type, and generally includes a rotor 40 at least partially enclosed by and rotatable within a corresponding perforated concave 42. It is, however, to be noted that in a combine of the conventional type, the invention can also be used and will lead to the same advantages as when rotary threshing is used. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42.

Grain that has been separated by the threshing and separating assembly 24 falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52, which provides an airflow through the sieves to remove chaff and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across the sieves 48, 50, while permitting the passage of cleaned grain by gravity through the openings of the sieves 48, 50.

Clean grain falls to a clean grain auger 56 positioned crosswise below and in front of the lower sieve 50. The clean grain auger 56 receives clean grain from each sieve 48, 50 and from the bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via the tailings auger 64 and the return auger 66 to the upstream end of the cleaning system 26 for repeated cleaning action. A pair of grain tank augers 68 at the bottom of the grain tank 28 convey the clean grain laterally within the grain tank 28 to the unloading auger 30 for discharge from the combine 10.

The non-grain crop material proceeds through a residue handling system 70. The residue handling system 70 may include a chopper, counter knives, a windrow door and a residue spreader.

Now, additionally referring to FIG. 2 there is shown and illustrated, in a schematic fashion, part of the threshing and separating system 24 and the cleaning system 26. The crop material 72 falls from the threshing and separating system 24 onto the grain pan 44 and the pre-cleaning sieve 46 and then onto sieve 48. For purposes of explaining the present invention, it will be discussed as being applied to the sieve 48, although it is to be understood that the present invention may be applied to other sieves in combine 10, and can be applied to more than one sieve at a time. A variable stroke sieve drive 76 is connected to the sieve 48 and is shown schematically in FIG. 2. It should be understood that the variable stroke sieve drive 76 may be connected to the sieve 48 in more than one location and may have multiple actuators, which are detailed below.

Now, additionally referring to FIGS. 3-6 there are shown additional details of the variable stroke sieve drive 76, which include a shaft 78, a shaft 80, a gear 82, a gear 84, an output shaft 86, an offset member 88, a shaft 90, an axis 92 and an interruptible drive connection 94. The shafts 78 and 80 are concentric about the axis 92, with the shaft 78 passing through the shaft 80. The shaft 78 is affixed to the gear 82 and the gear 84 is rotatably coupled to the shaft 90. The gears 82 and 84 are meshed together. Although gears 82 and 84 are the preferred embodiment and are essentially linked circular members, other constructs are also contemplated such as elliptical members that are drivingly coupled, among others constructs.

Figure 3:
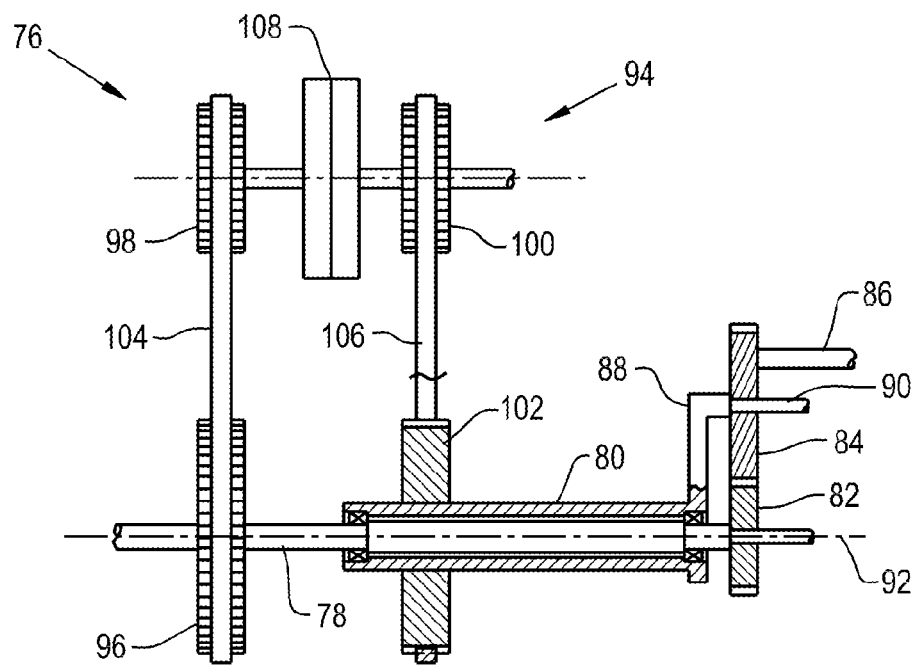
FIG. 3 is a partially sectioned view of the variable stroke sieve drive associated with the cleaning system of FIG. 2.
Figure 4:
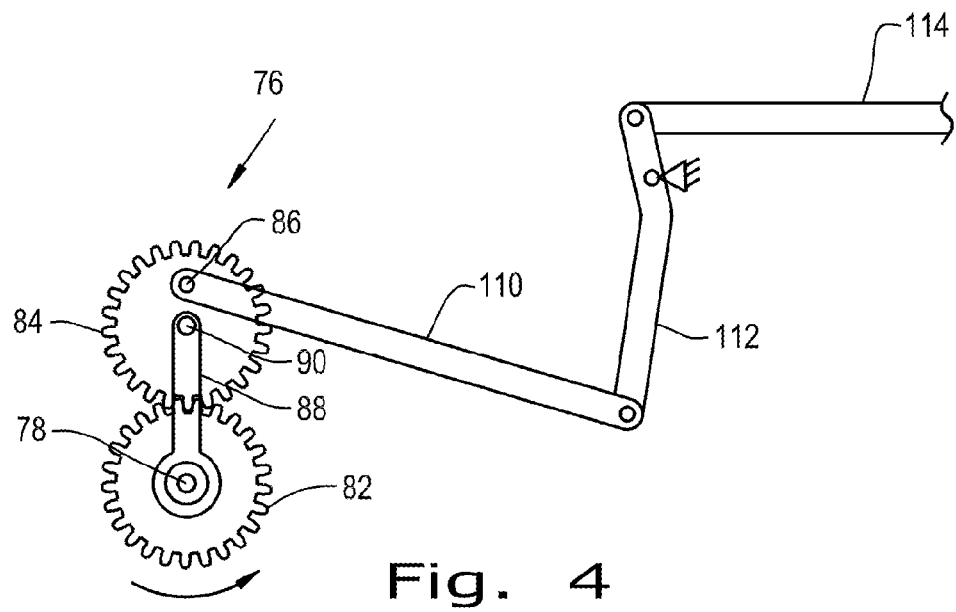
FIG. 4 is a somewhat schematical view of part of the variable stroke sieve drive of FIG. 3.
Figure 5:
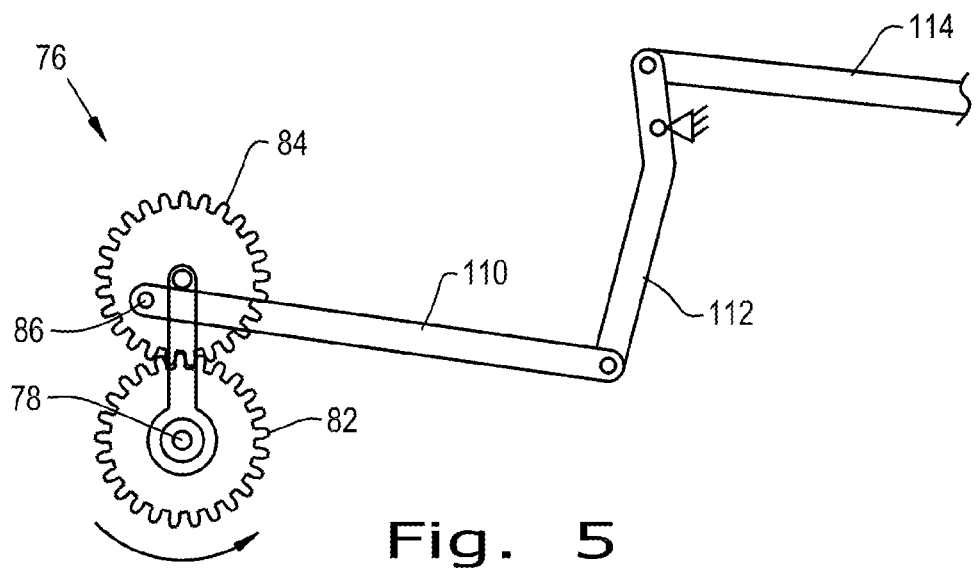
FIG. 5 is another view of the variable stroke sieve drive of FIG. 4 with a different stroke being selected from that shown in FIG. 4.

When the shaft 80 is moved angularly relative to the shaft 78 this causes the shaft 90 to be moved and hence the gear 84 relative to the gear 82, which then rotates the gear 84 causing the position of the output shaft 86. The movement of the output shaft 86 causes the distance from the axis 92 to the output shaft 86 to change thereby altering the amount of eccentricity used to drive the sieve 48. Most of the time during the operation of the variable stroke sieve drive 76 the angular position of the shaft 78 and the shaft 80 remain constant, causing the eccentricity to remain constant. However, when an adjustment is needed in the amount of the eccentricity then the angular relationship between the shaft 78 and the shaft 80 is varied, which results in a shifting in position of the gear 84 relative to the gear 82, and thus the distance of the output shaft 86 relative to the axis 92. The gears 82 and 84 are shown as being substantially the same size in FIGS. 4 and 5, but differing sizes are also contemplated and are shown in FIG. 3.

During operation, when the shafts 78 and 80 have a fixed angular relationship, the output shaft 86 rotates about the axis 92 at a fixed distance resulting in a fixed eccentricity to drive the sieve 48. It is contemplated that more than one variable stroke sieve drive 76 may be coupled to the sieve 48 and that the multiple drives 76 are coordinated to drive the sieve 48 in various ways to accomplish the goal of optimal grain cleaning and yield.

The interruptible drive connection 94 includes cogged pulleys 96, 98, 100 and 102, cogged belts 104 and 106, and a clutch 108. As long as the clutch 108 is drivingly coupled then the driving of the shaft 78 likewise drives the shaft 80 to thereby preserve the relationship of the fixed angular position of the shaft 78 and the shaft 80. When it is time to alter the eccentricity, then the clutch 108 disengages the drive train of cogged pulleys 96, 98, 100 and 102, to thereby allow the shaft 80 to not be directly driven by the shaft 78 and this lack of coupling causes the gear 84 to rotate relative to the gear 82 to change the eccentricity. The temporarily disengagement of the clutch 108 may, e.g., be realized by just loosening the connection or by actively creating a slippage between the gears. Slippage may, e.g., be obtained by braking one of the gears. It is also contemplated that instead of using cogged components that the drive can be accomplished with a gear system.

Figure 6:
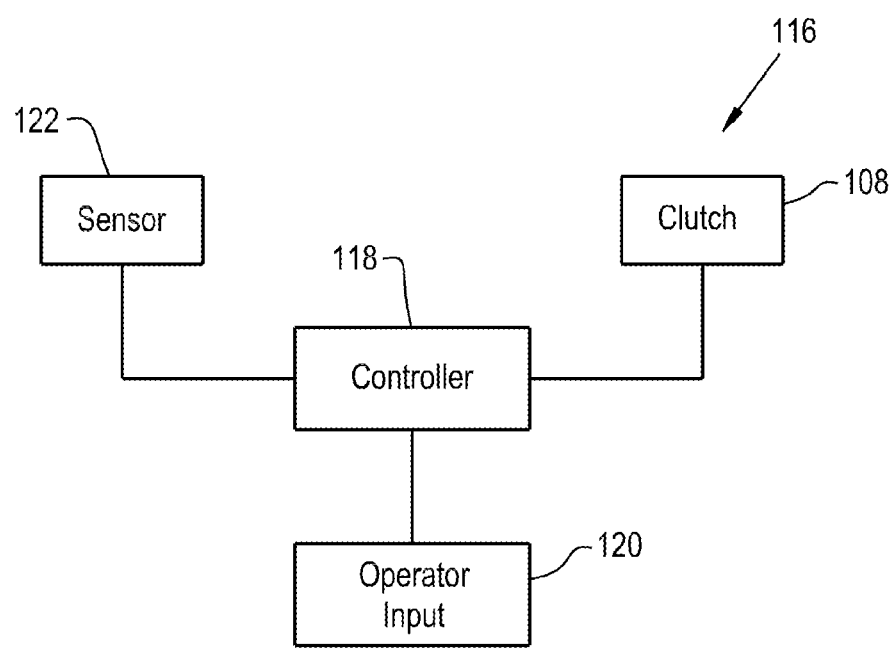
FIG. 6 is a schematical representation of an embodiment of a control for the variable stroke sieve drive system of the present invention.

The eccentricity of the output shaft 86 is used to drive the sieve 48 by way of links 110, 112 and 114. A drive control system 116, is illustrated in FIG. 6 and includes a controller 118, an operator input device 120 and sensors 122. The controller 118 is operatively connected to the clutch 108 to cause it to engage and disengage. The operator can send a command to the controller 118 by way of the operator input device 120, which may be incorporated into other input systems of the harvester 10. The command can be for a changed eccentricity, which the controller 118 is to achieve and maintain. It is also contemplated that the operator may command the controller 118 to carry out automated eccentricity control scenarios, such as automated changes to alter the performance of the sieve 48 to enhance material flow on the sieve 48 and to optimize the grain cleaning process. It is also contemplated that the functions of the controller 118 may be incorporated into another controller in the combine 10, and that the controller 118 not be a standalone element.

The present invention has no midpoint displacement. The adjustable stroke of the present invention will influence the material transport velocity in the cleaning system and can be used to compensate for hilly field conditions and for differing crop conditions, by way of algorithms carried out in the controller 118 and items sensed by sensors not shown.

The present invention has certain advantages including improved cleaning system performance allowing the cleaning system 26 to be able to more effectively separate the grain from the material other than grain.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A cleaning section of an agricultural harvester, the cleaning section comprising:
 a sieve positioned in the harvester to receive crop material from a threshing section;
 wherein at least one variable stroke sieve drive coupled to said sieve, said variable stroke sieve drive comprising a first shaft; and a second shaft concentric with said first shaft, a relative angular position between said first shaft and said second shaft establishing an amount of eccentricity of said variable stroke sieve drive.

2. The cleaning section of claim 1, wherein said variable stroke sieve drive further comprises:
 an output shaft coupled to said sieve to drive said sieve at said eccentricity amount;
 a first rotating member coupled to said first shaft; and
 a second rotating member indirectly coupled to said second shaft, said first rotating member being engaged with said second rotating member, said output shaft extending from said second rotating member.

3. The cleaning section of claim 2, wherein said variable stroke sieve drive further comprises an offset member connected to said second shaft, said offset member being rotatably coupled to said second rotating member.

4. The cleaning section of claim 2, wherein said first rotating member and said second rotating member are circular gears that are meshed together.

5. The cleaning section of claim 2, wherein said amount of eccentricity is established by a distance between said first shaft and said output shaft.

6. The cleaning section of claim 2, wherein said first rotating member and said second rotating member remain fixed relative to each other except when the amount of eccentricity is changed.

7. The cleaning section of claim 2, wherein said first rotating member and said second rotating member are moved relative to each other to change the amount of eccentricity of the variable stroke sieve drive.

8. The cleaning section of claim 2, wherein said output shaft is not coaxial with said second rotating member.

9. The cleaning section of claim 1, wherein said first shaft and said second shaft are driven at the same angular velocity except when the amount of eccentricity is changed.

10. The cleaning section of claim 1, wherein said variable stroke sieve drive further comprises an interruptible drive connection, said first shaft and said second shaft are drivingly coupled by way of the interruptible drive connection.

11. The cleaning section of claim 10, wherein said variable stroke sieve drive further comprises a controller coupled to said interruptible drive connection, said controller being configured to cause said interruptible drive connection to disengage said first shaft from said second shaft thereby allowing the angular position between said first shaft and said second shaft to vary.

12. The cleaning section claim 11, wherein said controller is configured to cause said interruptible drive connection to disengage said first shaft from said second shaft for a portion of a revolution to thereby allow the angular position between said first shaft and said second shaft to vary by a predetermined amount to alter the amount of eccentricity.

\* \* \* \* \*